219-121 SR
10/24/78 OR 4,122,328

United States Patent [19]
Essers et al.

[11] 4,122,328
[45] Oct. 24, 1978

[54] DEVICE AND WELDING TORCH FOR PLASMA-MIG-WELDING

[75] Inventors: Wilhelmus Gerardus Essers; Gerardus Jelmorini; Gerrit Willem Tichelaar, all of Eindhoven, Netherlands

[73] Assignee: U.S. Philips Corporation, New York, N.Y.

[21] Appl. No.: 778,603

[22] Filed: Mar. 17, 1977

[30] Foreign Application Priority Data

Mar. 31, 1976 [NL] Netherlands ........................ 7603318

[51] Int. Cl.[2] ........................................ B23K 9/00
[52] U.S. Cl. .......................... 219/121 P; 219/137.61; 219/137.44
[58] Field of Search ................. 219/121 P, 121 R, 74, 219/75, 76, 130, 136, 76.16, 76.15; 313/231.3

[56] References Cited

U.S. PATENT DOCUMENTS

| | | | |
|---|---|---|---|
| 2,982,845 | 5/1961 | Yenni | 219/75 X |
| 3,312,566 | 4/1967 | Winzeler et al. | 219/75 X |
| 3,830,997 | 8/1974 | Essers et al. | 219/121 P X |

FOREIGN PATENT DOCUMENTS

| | | | |
|---|---|---|---|
| 643,678 | 6/1962 | Canada | 219/121 P |
| 3,718,862 | 1962 | Japan | 219/74 |
| 925,089 | 5/1963 | United Kingdom | 219/121 P |

*Primary Examiner*—J. V. Truhe
*Assistant Examiner*—M. Paschall
*Attorney, Agent, or Firm*—Frank R. Trifari; Rolf E. Schneider

[57] ABSTRACT

A compact plasma-MIG welding torch in which the contact tube and the nozzle are directly connected together electrically, thereby enabling welding with a very short extension of the welding wire.

4 Claims, 1 Drawing Figure

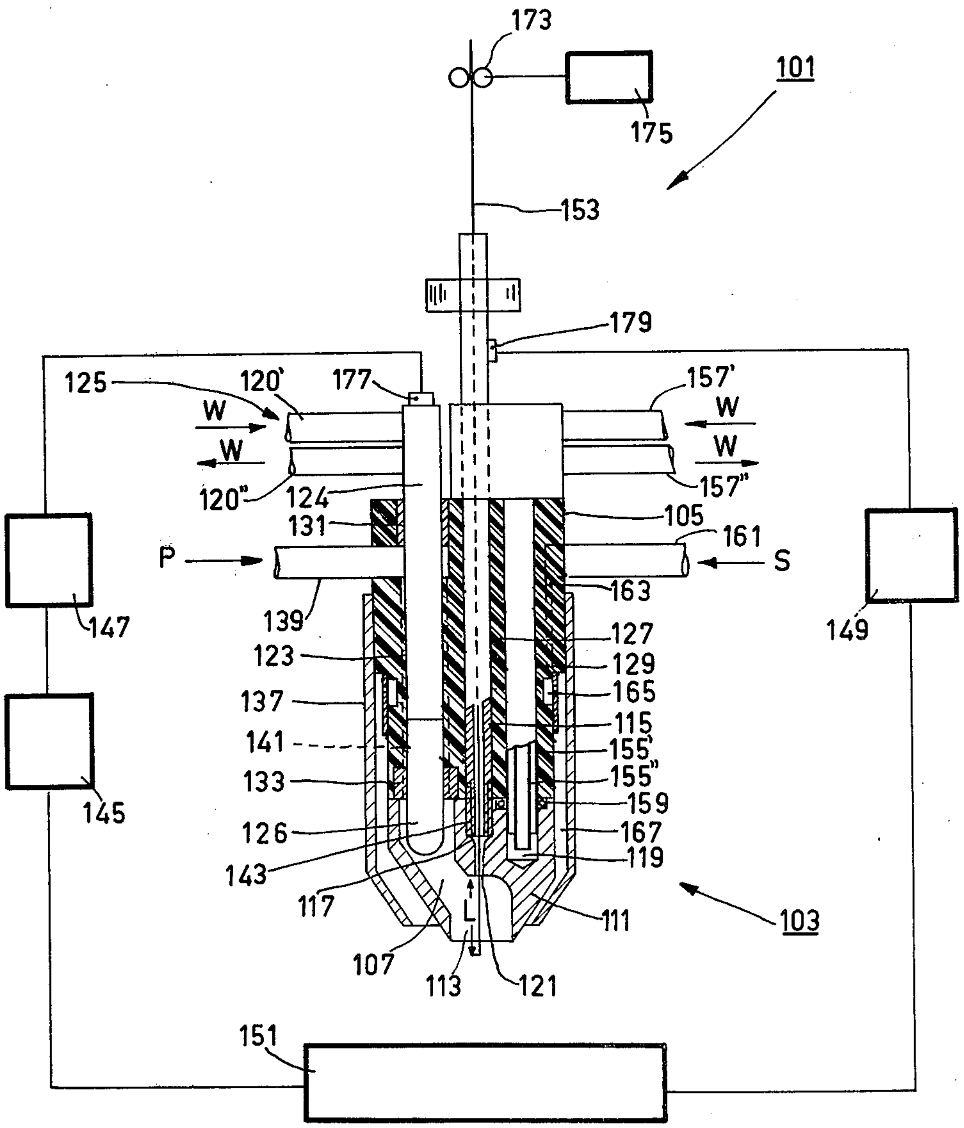
173
175
101
153
179
125
120'
177
157'
W
W
W
W
120"
124
157"
105
131
161
P
S
139
163
147
127
149
123
129
137
165
115
141
155'
133
155"
159
145
126
167
143
119
117
L
111
103
107
113
121
151

DEVICE AND WELDING TORCH FOR PLASMA-MIG-WELDING

This invention relates to a device for plasma-MIG-welding, comprising a welding torch provided with a housing with a nozzle, a non-consumable electrode, a contact tube for feeding and guiding a consumable electrode, means for the supply of a plasma gas, and means for driving the consumable electrode, the non-consumable electrode being connected to a first power supply source, whilst the contact tube is connected to a second power supply source.

A device of this kind is known from Pat. No. 3,891,824. In this known device a plasma arc is maintained between the non-consumable electrode and a workpiece; a welding wire is fed via the contact tube and a MIG-arc is maintained between this welding wire and the workpiece. The nozzle is electrically insulated from the non-consumable electrode as well as from the contact tube. This construction has a drawback in that considerable space is occupied by the electrical insulation between the contact tube and the nozzle and by the separate cooling systems required for the contact tube and nozzle. As a result, the minimum extension of the welding wire beyond the contact tube is limited. It has been found that the transition current intensity at which rotation of the MIG-arc takes place, as described in Patent 3,891,824, decreases as the wire extension increases. For given applications, however, a higher transition current intensity and hence a shorter wire extension are desirable. Wire extension is to be understood to mean herein the current-carrying part of the welding wire, taken from the contact tube as far as its free end.

The invention has for its object to provide a device which enables welding with shorter extensions of the welding wire, so that other circumstances which are advantageous for specific cases can be achieved, for example, increased transition current intensity, higher temperature of the molten pool etc., the range of application of the plasma-MIG-welding process thus being extended.

This object is achieved in accordance with the invention in that the contact tube and the nozzle are directly connected together electrically. This step eliminates the insulation between the nozzle and the contact tube and the need for separate cooling of the contact tube, which is now cooled via the nozzle, so that the distance between the contact tube and the nozzle aperture can be reduced, which results in a smaller extension of the welding wire. The housing may or may not be insulated relative to the nozzle and the contact tube.

The step in accordance with the invention enables a particularly attractive construction of a welding torch for plasma-MIG-welding which comprises a housing with a nozzle, a non-consumable electrode in the housing, a contact tube, a passage through the housing and nozzle for a gas supply and means for establishing respective electrical connections to the non-onsumable electrode and to the contact tube; the welding torch being characterized in that the nozzle and the contact tube thermally, electrically, and mechanically form one integral unit. This step eliminates the insulation between the contact tube and the nozzle, which results in a compact construction of the welding torch which can be used as a hand torch.

A preferred embodiment of the welding torch in accordance with the invention is characterized in that the nozzle is a single piece of copper provided with a bore into which the contact tube is inserted. This step enables a construction of minimum dimensions, the contact tube being exchangeable in view of wear and it being possible to make this tube of the desired material, preferably tungsten.

In a further preferred embodiment of the welding torch in accordance with the invention, the housing is made of an electrically insulating material. The construction of the welding torch is thus simplified and, moreover, if a shield is used to supply and conduct a shielding gas, the electrical insulation thereof is simply obtained.

The sole FIGURE in the drawing is a schematic sectional view of a plasma are torch.

An embodiment of the invention will now be described in detail with reference to the drawing.

The device 101 shown comprises a welding torch 103 which consists of a housing 105, made of a synthetic material, provided with a nozzle 111; the nozzle 111 is made from a copper block in which a chamber 107 and a plasma aperture 113 are recessed. Bores 117, 119 and 121 are also provided in the nozzle 111, whilst the housing 105 is provided with bores 123, 127 and 129. Arranged in the bore 123 is a non-consumable electrode 125 which is centered in the bore 123 by a sealing ring 131 and a gas distribution ring 133. A plasma gas supply duct 139 communicates, via ducts 141 on the inner circumference of the bore 123 and the gas distribution ring 133, with the chamber 107. The non-consumable electrode 125 consists of a copper holder 124 and a tungsten electrode 126 which is to be loaded by the plasma arc. Connections 120′, 120″, for the supply and discharge of cooling water communicate with cooling ducts (not shown) in the holder 124.

The bores 117 of the nozzle and 127 of the housing accommodate a contact tube 115 which is preferably made of tungsten; the housing, the nozzle, and the contact tube being mechanically interconnected in a simple manner by means of a screwed connection 143, thus ensuring proper thermal, electrical, and mechanical coupling between the nozzle and the contact tube. In the bore 119 a tubular passage 155′ is formed by a tube 155″ concentrically arranged in the bore. Connections 157′, 157″ for the supply and discharge of cooling water communicate with the bore 119 in the nozzle via the passage 155′ and the tube 155″, the said bore acting as a cooling chamber. An O-ring 159 provides sealing of the cooling chamber 119. A connection 161 for the supply of a shielding gas S communicates, via ducts 163 and an annular duct 165, with an annular space 167 formed between the inner circumference of a shield 137 on the one side and the outer circumference of the housing 105 and the nozzle 111 on the other side. The device 101 also comprises a first power supply source 145, with a high-frequency generator 147, and a second power supply source 149. The reference 151 denotes a workpiece to be treated. A welding wire 153 (consumable electrode) can be supplied by means of transport rollers 173 which are driven at a controllable speed by an electric motor 175. The non-consumable electrode 125 comprises a connection terminal 177 and the contact tube comprises a connection terminal 179.

A plasma gas P preferably an inert gas such as argon is supplied via the connection 139 for the welding of the workpiece 151, the said gas flowing through the ducts 141 and the chamber 107 in the direction of the nozzle aperture 113. The welding wire 153, driven by the transport rollers 173, is fed through the contact tube 115 and is guided through the bore 121 in the nozzle and through the aperture 113 in the direction of the workpiece 151. A plasma arc is maintained between the non-consumable electrode 125 and the workpiece 151, the electrode 125 being connected, by way of the contact 177 and the high-frequency generator 147, to one pole of the power supply source 145, the other pole of which is connected to the workpiece 151.

Between the workpiece 151 and the welding wire 153 a MIG-arc is maintained by means of the power supply source 149, one pole of which is connected to the workpiece 151 whilst its other pole is connected to the welding wire 153 via the connection terminal 179 on the contact tube 115. Via the connection 161, shielding gas S, for example a mixture of argon and carbon dioxide can be supplied in order to protect the weld against oxidation. The non-consumable electrode 125 is cooled by circulation of cooling water W via the connections 120' and 120". The nozzle 111 is cooled by circulation of cooling water W in the cooling chamber 119. The mechanical and thermal coupling of the nozzle 111 and the contact tube 115 also provides cooling of the contact tube.

Thanks to the compact construction, enabled by the steps taken in accordance with the invention, welding can be effected with an extension L of the welding wire of only 14 mm; as opposed to a minimum of 26 mm in welding torches commonly used for plasma-MIG-welding thus far.

What is claimed is:

1. A plasma-MIG welding torch, which comprises a housing provided with a nozzle and having a first passage; a contact tube positioned in said first passage and electrically connected directly to said nozzle, said contact tube being electrically insulated with respect to said housing and serving to continuously direct a consumable electrode into said nozzle; first means associated with said contact tube to supply power thereto and to the consumable electrode; a non-consumable electrode mounted in a second passage separated from said first passage and electrically insulated with respect to said housing and with respect to said contact tube; second means associated with said non-consumable electrode to separately supply power thereto; and a third passage in said housing for flowing a plasma gas through said nozzle.

2. A welding torch according to claim 1, in which the nozzle is formed as a single integral unit provided with a base into which the contact tube is inserted.

3. A welding torch according to claim 2, in which the nozzle unit consists of copper.

4. A welding torch according to claim 1, in which the housing is made of an electrically insulating material.

* * * * *